United States Patent
Kurita

(10) Patent No.: US 9,472,882 B2
(45) Date of Patent: Oct. 18, 2016

(54) TERMINAL-FITTED RETAINER AND CONNECTOR

(71) Applicant: Sumitomo Wiring Systems, Ltd., Yokkaichi, Mie (JP)

(72) Inventor: Atsushi Kurita, Mie (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 0 days.

(21) Appl. No.: 14/685,931

(22) Filed: Apr. 14, 2015

(65) Prior Publication Data

US 2015/0303605 A1 Oct. 22, 2015

(30) Foreign Application Priority Data

Apr. 17, 2014 (JP) ................................. 2014-085241

(51) Int. Cl.
*H01R 13/40* (2006.01)
*H01R 13/424* (2006.01)
*B60L 11/18* (2006.01)

(52) U.S. Cl.
CPC ......... *H01R 13/424* (2013.01); *B60L 11/1818* (2013.01)

(58) Field of Classification Search
CPC ... H01R 13/424; B60L 11/1818; B60L 11/18
USPC ................................................ 439/733.1, 34
See application file for complete search history.

(56) References Cited

U.S. PATENT DOCUMENTS 4,772,229 A * 9/1988 Nix ..................... H01R 13/4362
439/733.1
8,662,910 B2 3/2014 Ichio et al.

* cited by examiner

*Primary Examiner* — Javaid Nasri
(74) *Attorney, Agent, or Firm* — Gerald E. Hespos; Michael J. Porco; Matthew T. Hespos

(57) ABSTRACT

A terminal-fitted retainer (20) includes terminals (50) that have recesses (57) provided on outer peripheral surfaces thereof and to be inserted and accommodated into terminal accommodating chambers (38) formed in a housing (30) from behind. A retainer (70) is mounted into the housing (30) while retaining the terminals (50). The retainer (70) includes terminal holding portions (74) for holding the terminals (50) by being fit into the recesses (57) and thick portions (78) to be accommodated into clearances formed between the terminal holding portions (74) and either front or rear surfaces of the recesses (57) in a front-back direction.

7 Claims, 4 Drawing Sheets

TERMINAL-FITTED RETAINER AND CONNECTOR

BACKGROUND

1. Field of the Invention

The invention relates to a terminal-fitted retainer and a connector.

2. Description of the Related Art

U.S. Pat. No. 8,662,910 discloses a connector to be mounted in a vehicle. This connector includes a terminal accommodating portion in which terminal fittings are accommodated, a retainer for retaining the terminal fittings, a rubber plug mounted on a back surface side of the retainer and a rubber plug presser mounted on a back surface side of the rubber plug. The terminal fitting includes a terminal connecting portion in the form of a round bar, a wire connecting portion provided behind the terminal connecting portion and a front stop formed between the terminal connecting portion and the wire connecting portion. The retainer is provided with contact portions that contact the front stops from behind. The retainer is fixed to the terminal accommodating portion so that the respective terminal fittings are retained so as not to come out backward by the respective contact portions.

However, it is necessary to set clearances between the terminal fittings and the contact portions in consideration of manufacturing tolerance in order to mount the retainer into the terminal accommodating portion. If the clearances are set, the terminal fittings are allowed to rattle. For example, in the case of adopting such a configuration that a plurality of terminal fittings are assembled with a retainer in advance to form a terminal-fitted retainer and the plurality of terminal fittings are collectively accommodated into a terminal accommodating portion, the terminal fittings are somewhat inclined, making it difficult to assemble the terminal-fitted retainer with a housing.

Accordingly, it is an object of the invention to allow for a better operability of a retainer and of an assembling procedure.

SUMMARY OF THE INVENTION

The invention relates to terminal-fitted retainer that includes a terminal including a recess provided on an outer peripheral surface and to be inserted and accommodated from behind into a terminal accommodating chamber formed in a housing. A retainer is mounted into the housing for retaining the terminal. The retainer includes a terminal holding portion for holding the terminal by being fit into the recess and a thick portion to be accommodated into a clearance formed between the terminal holding portion and either front or rear surfaces of the recess in the front-back direction. Accordingly, rattling of the terminal can be prevented, and the terminal will not The terminal may include a shaft. A front engaged portion may be behind and coaxial with the shaft. The front engaged portion may have a larger diameter than the shaft. A retainer mounting portion may be behind and coaxial with the front engaged portion and may have a smaller diameter than the front engaged portion. A rear engaged portion may be behind and coaxial with the retainer mounting portion and may be formed by resin molding. A rear surface of the front engaged portion may define the front surface of the recess and/or a front surface of the rear engaged portion may define the rear surface of the recess.

According to this configuration, the recess need not be formed by cutting and can be formed by resin molding. Thus, the recess is formed easily. For example, in the case of a terminal to be bent (e.g. at about 90°) behind a recess, the recess is formed by cutting after bending. Thus, manufacturing is very difficult. In such a case, the above configuration may be adopted.

The terminal holding portion may include two holding projections arranged to face each other while being spaced apart by a distance smaller than an outer diameter of the retainer mounting portion and may surround the retainer mounting portion over half the circumference or more from one of the holding projections to the other holding projection. Thus, the retainer mounting portion can be held by the holding projections so as not to come out of the terminal holding portion.

The terminal holding portion may contact the front engaged portion and the thick portion may project back from a rear end part of the terminal holding portion and/or may contact the rear engaged portion. Accordingly, the terminal is not likely to incline by the contact of the terminal holding portion with the rear engaged portion while the terminal is retained by the contact of the terminal holding portion with the rear engaged portion.

The connector may include a housing with an outer housing to be fixed to a body of a vehicle and an inner housing to be fit into the outer housing from an inner side of the vehicle. The terminal-fitted retainer may be assembled completely with the outer housing by accommodating the terminal into a terminal accommodating chamber on the side of the outer housing after being assembled temporarily with the inner housing by accommodating the terminal into the terminal accommodating chamber on the side of the inner housing. Thus, a temporary assembling operation is facilitated since the inclination of the terminal can be suppressed when assembling the terminal-fitted retainer with the inner housing. A complete assembling operation also is facilitated since the inclination of the terminal can be suppressed when the terminal-fitted retainer is assembled with the outer housing.

According to the technology disclosed by this specification, it is possible to suppress the inclination of a terminal fitting in a terminal-fitted retainer in which the terminal is assembled with a retainer.

These and other features of the invention will become more apparent upon reading the following detailed description and accompanying drawings.

DETAILED DESCRIPTION

Figure 1:
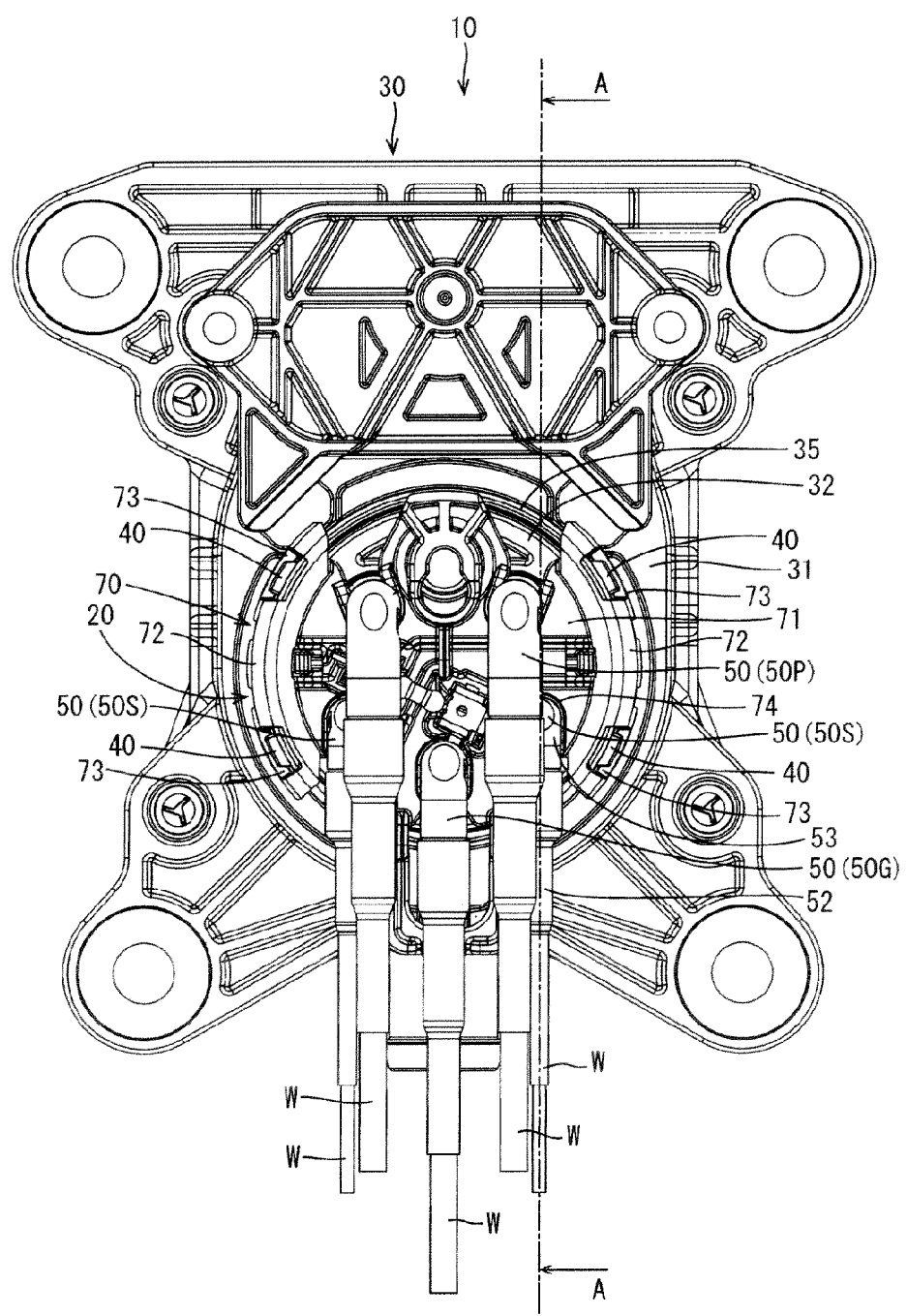
FIG. 1 is a rear view of a connector.
Figure 2:
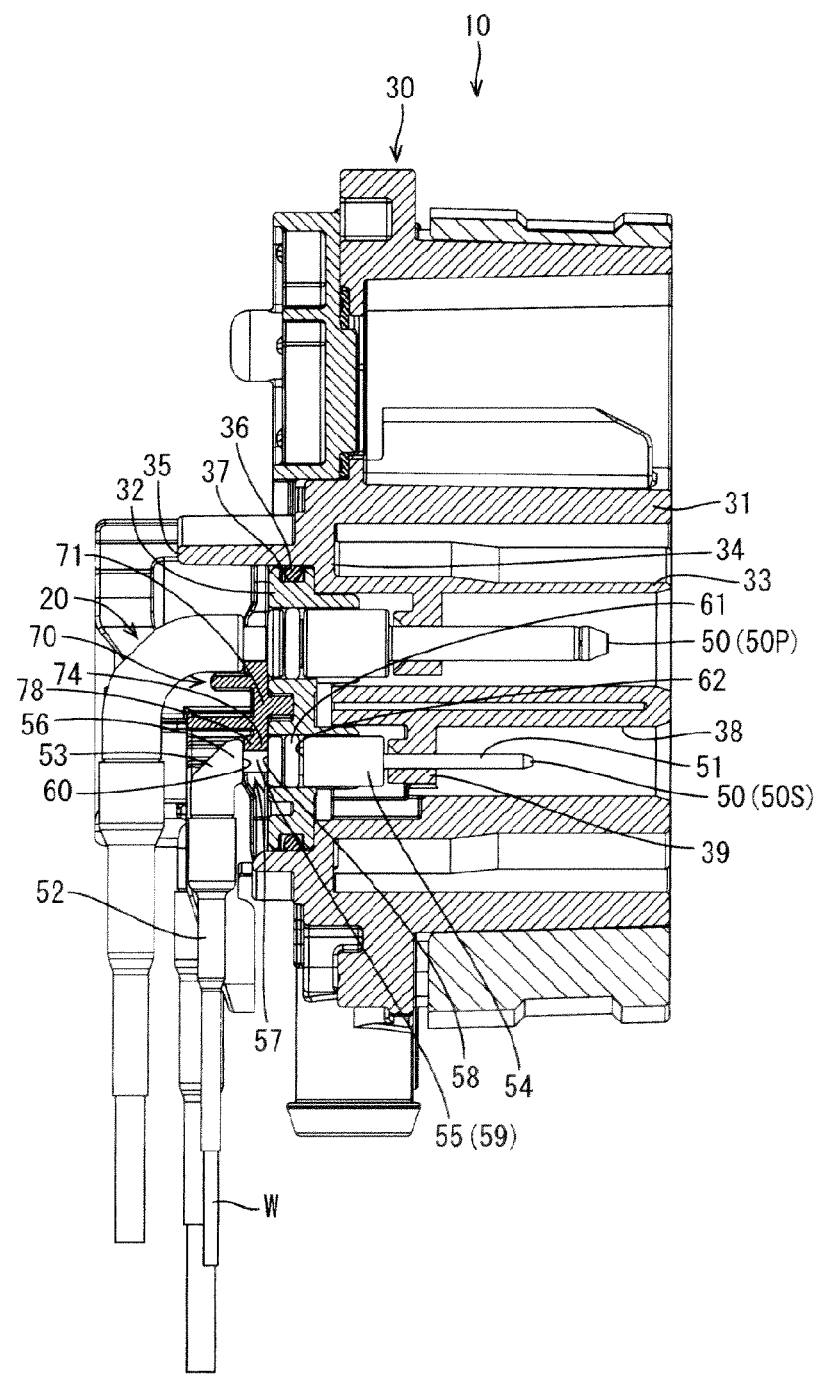
FIG. 2 is a section along A-A of FIG. 1.

A connector in accordance with an embodiment is identified generally by the numeral 10 in FIGS. 1 and 2. The connector 10 includes a housing 30 made of synthetic resin, terminals 50 and a retainer 70 for retaining the terminals 50. The connector 10 is a vehicle-side connector mounted, for example, on a body of an automotive vehicle, such as an electric vehicle, a hybrid vehicle or the like and may be called an inlet. The connector 10 may be connected to a battery mounted in the automotive vehicle and the battery may be charged by connecting a charging connector in a charger to the connector 10.

As shown in FIG. 2, the housing 30 includes a connector fitting 33 into which the charging connector can fit, an outer housing 31 fixed to the body of the vehicle and an inner housing 32 fit to a back wall 34 of the connector fitting 33 from behind. The inner housing 32 is fit into the connector fitting 33 from an inner side of the vehicle. A rearwardly open receptacle 35 is provided on the back wall 34 of the connector fitting 33. The receptacle 35 has a cylindrical shape and projects back from the rear surface of the back wall 34 of the connector fitting 33.

The inner housing 32 has a substantially flat tubular shape having a smaller axial dimension than a radial dimension. A rubber ring fitting recess 37 is provided circumferentially on an outer peripheral part of the inner housing 32 and can receive a resilient or rubber ring 36. The rubber ring 36 is sandwiched between the inner peripheral surface of the receptacle 35 and the outer peripheral surface of the rubber ring fitting recess 37 when the inner housing 32 is fit into the receptacle 35, thereby sealing between these peripheral surfaces in a liquid-tight manner.

Terminal accommodating chambers 38 are formed in the housing 30 for individually accommodating the terminals 50. The terminal accommodating chambers 38 penetrate from the connector fitting portion 33 to the inner housing 32 in a front-back direction. A front stop wall 39 is provided in the terminal accommodating chamber 38 for stopping the terminal 50 in front. The front stop wall 39 is arranged in the terminal accommodating chamber 38 on the side of the connector fitting 33 and includes a hole through which a later-described terminal connecting shaft portion 51 of the terminal 50 is to be inserted. The terminal 50 is stopped in front by the contact of the front surface of a later-described front engaged portion 54 of the terminal 50 with the front stop wall 39 from behind.

As shown in FIG. 1, the terminals 50 include two power terminals 50P, one ground terminal 50G and two signal terminals 50S, all of which are L-shaped round pin terminals in this embodiment. Since the respective terminals 50 have similar shapes, but differ in size, the signal terminal 50S is described as a representative below and similar or common components are denoted by the same reference signs.

As shown in FIG. 2, the terminal 50 includes the terminal connecting shaft 51 to be connected to a mating terminal, a wire connecting tube 52 to be connected to a wire W, a resin molded portion 53 arranged between the terminal connecting shaft 51 and the wire connecting tube 52 and forming an L shape.

A front engaged portion 54 is behind and coaxial with the terminal connecting shaft 51 and has a larger diameter than the terminal connecting shaft 51. Further, a retainer mounting portion 55 is behind and coaxial with the front engaged portion 54 and has a smaller diameter than the front engaged portion 54. The resin molded portion 53 is formed on the outer peripheral surface of a metal shaft body by resin molding and is behind and coaxial with the retainer mounting portion 55. The metal shaft body is connected to the wire connecting tube 52. Further, a horizontal part of the resin molded portion 53 is coaxial with the retainer mounting portion 55 and defines a rear engaged portion 56.

Figure 4:
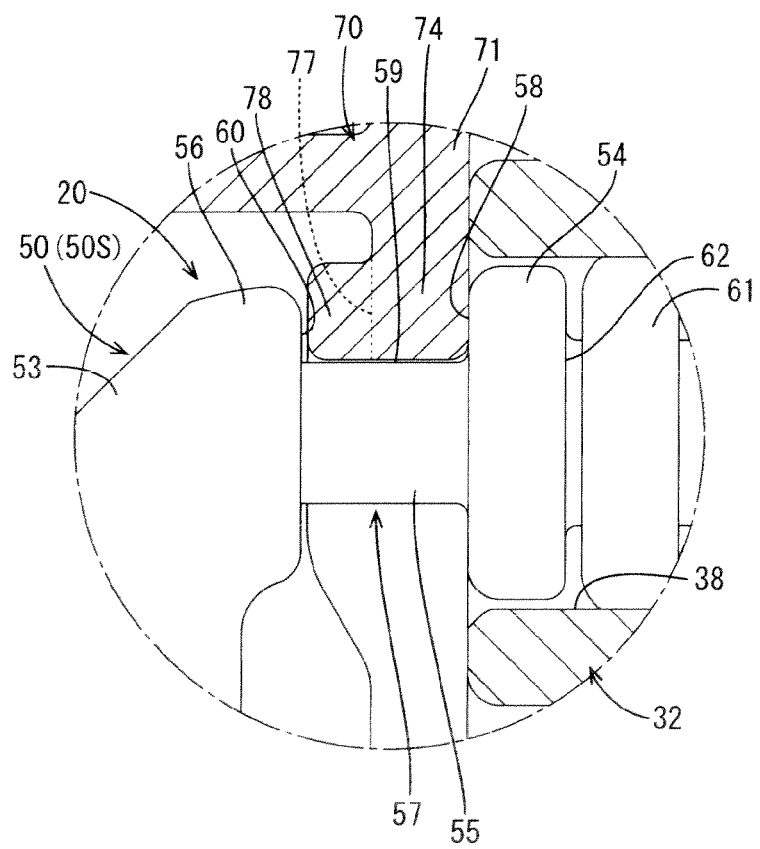
FIG. 4 is an enlarged section of a terminal holding portion in FIG. 2.

As shown in FIG. 4, a recess 57 is formed between the front engaged portion 54 and the rear engaged portion 56. The recess 57 is a space enclosed by a rear surface 58 of the front engaged portion 54, a peripheral surface 59 of the retainer mounting portion 55 and a front surface 60 of the rear engaged portion 56. Thus, the rear surface 58 of the front engaged portion 54 defines the front surface of the recess 57 and the front surface 60 of the rear engaged portion 56 defines the rear surface of ring the recess 57.

A rubber ring mounting recess 62 is circumferentially provided on an outer peripheral part of the front engaged portion 54 and a resilient or rubber ring 61 is mounted therein. The rubber ring 61 is sandwiched between the inner peripheral surface of the terminal accommodating chamber 38 and the outer peripheral surface of the rubber ring mounting recess 62 when the terminal 50 is accommodated into the terminal accommodating chamber 38 on the side of the inner housing 32, thereby sealing between these peripheral surfaces in a liquid-tight manner.

Figure 3:
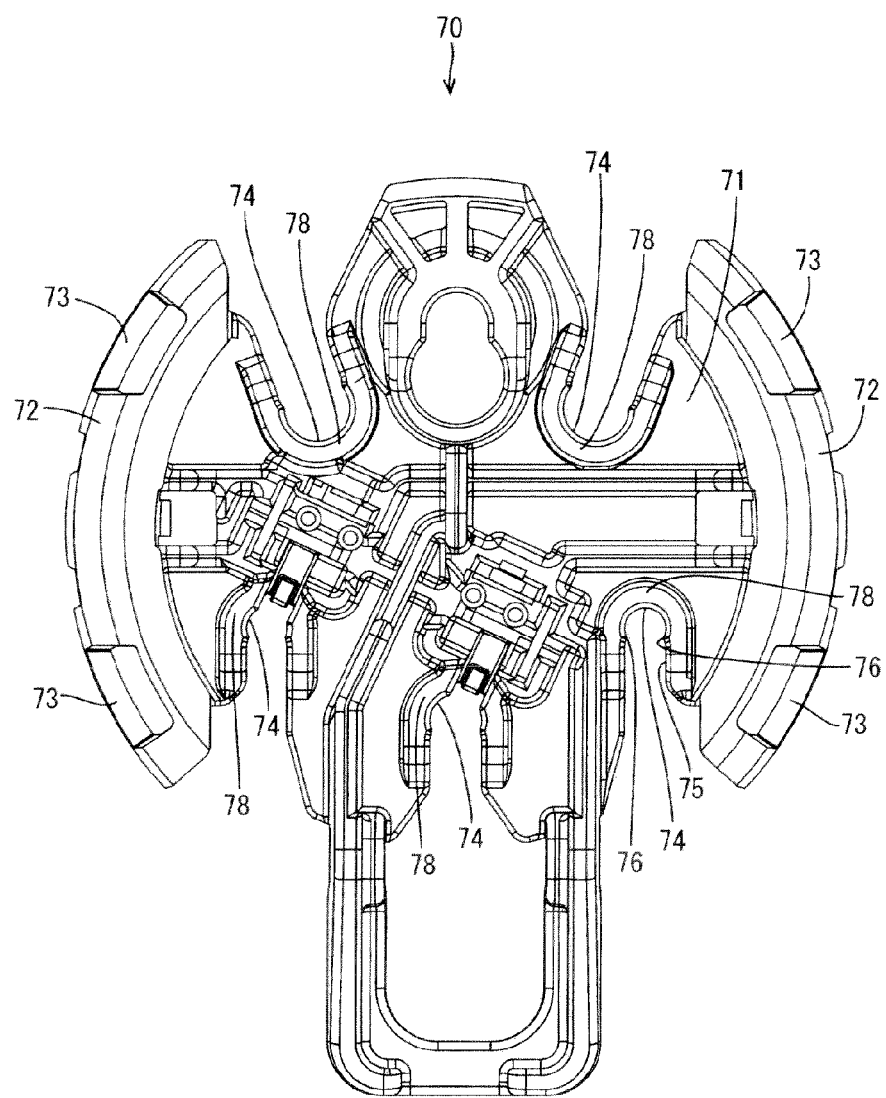
FIG. 3 is a front view of a retainer.

As shown in FIG. 3, the retainer 70 includes a retainer main body 71 with substantially U-shaped terminal holding portions 74, and two peripheral walls 72 projecting forward from opposite edge parts of the retainer main body 71 while having an arcuate shape. The peripheral wall 72 has upper and lower lock pieces 73. As shown in FIG. 1, the lock pieces 73 are locked to upper and lower lock projections 40 formed on the outer peripheral surface of the connector fitting 33. The respective lock pieces 73 are arranged on opposite left and right sides of the connector fitting 33 and locked to the corresponding lock projections 40 so that the retainer 70 (terminal-fitted retainer 20 to be described later) is held in a state completely assembled with the connector fitting 33 of the outer housing 31.

The terminal holding portion 74 is provided at a back side of a terminal introducing portion 75 that is open on the outer periphery of the retainer main body 71. The retainer mounting portion 55 of the terminal 50 is introduced into the terminal introducing portion 75. A horizontal part of the terminal 50 penetrates the retainer main body 71 in the front-back direction when the retainer mounting portion 55 reaches the terminal holding portion 74 thereby forming the terminal-fitted retainer 20. At this time, as shown in FIG. 1, a part of the terminal 50 behind the resin molded portion 53 is drawn out down along the rear surface of the retainer main body 71.

As shown in FIG. 3, the terminal holding portion 74 has two holding projections 76 that face each other while being spaced apart by a distance smaller than an outer diameter of the retainer mounting portion 55 and surround the retainer mounting portion 55 over at least half the circumference from one of the holding projections 76 to the other. Thus, the terminal holding portion 74 is constricted at the position of the holding projections 76. Thus, when the retainer mounting portion 55 is mounted in the terminal holding portion 74, the retainer mounting portion 55 is retained by a constricted portion composed of the holding projections 76.

As shown in FIG. 4, a thick portion 78 projects back on a rear part 77 of the terminal holding portion 74. The thick portion 78 and the terminal holding portion 74 are accommodated in the recess 57 of the terminal 50. The inner peripheral surface of the thick portion 78 and the inner peripheral surface of the terminal holding portion 74 are flush and continuous with each other in the front-back direction. The presence of the thick portion 78 in the clearance between the rear part 77 of the terminal holding portion 74 and the front surface 60 of the rear engaged portion 56 holds the terminal holding portion 74 in contact with the rear surface 56 of the front engaged portion 54 of the terminal 50 from behind and prevents the terminal 50 from rattling. On the other hand, the thick portion 78 suppresses inclination of the terminal 50 by contacting the front surface 60 of the rear engaged portion 56 from behind.

The thick portion 78 suppresses rattling of the terminal 50 and prevents an oblique downwardly inclined posture of the front end of the terminal 50.

The terminals 50 (power terminals 50P, ground terminal 50G and signal terminals 50S) are connected to ends of the wires W are mounted into the retainer 70. The recess 57 of each terminal 50 is inserted into a radially inner side through an entrance part of the terminal holding portion 75 in the retainer 70 and is fit into a back end part of the terminal holding portion 74 after passing between the holding projections 76. Simultaneously, the terminal holding portion 74 and the thickening portion 78 are fit into the recess 57. The terminal-fitted retainer 20 is completed when all of the terminals 50 are mounted into the retainer 70.

This terminal-fitted retainer 20 is in such a posture that each terminal 50 projects substantially vertically from the front surface of the retainer main body 71. Thus, the terminal connecting shafts 51 of the respective terminals 50 can be inserted collectively into the terminal accommodating chambers 32 on the side of the inner housing 32. The accommodation of all of the terminals 50 into the terminal accommodating chambers 38 on the side of the inner housing 32 forms a subassembly in which the terminals 50, the inner housing 32 and the retainer 70 are assembled temporarily with each other.

Similar to the terminal-fitting retainer 20, this subassembly is in a posture so that the each terminal 50 projects substantially vertically from the front surface of the inner housing 32. Thus, the terminal connecting shafts 51 of the respective terminals 50 can be inserted collectively into the terminal accommodating chambers 38 on the side of the outer housing 31. The accommodation of all of the terminals 50 into the terminal accommodating chambers 38 on the side of the outer housing 31 completes the assembly of the connector 10 in which the subassembly and the outer housing 31 are completely assembled with each other.

As described above, the thick portion 78 is accommodated into the clearance formed between the terminal holding portion 74 and one of the front and rear surfaces of the recess 57 in the front-back direction when the terminal 50 is held by the terminal holding portion 74. Thus, the terminal 50 cannot rattle and will not be assembled with the retainer 70 in an inclined state.

The terminal 50 may include: the terminal connecting shaft 51; the front engaged portion 54 coaxial with and behind the terminal connecting shaft 51 and having a larger diameter than the terminal connecting shaft 51; the retainer mounting portion 55 coaxial with and behind the front engaged portion 54 and having a smaller diameter than the front engaged portion 54; and the rear engaged portion 56 coaxial with and behind the retainer mounting portion 55 and formed by resin molding. The rear surface 58 of the front engaged portion 54 may be the front surface of the recess 57 and the front surface 60 of the rear engaged portion 56 may be the rear surface of the recess 57. According to this configuration, the recess 57 need not to be formed by cutting and can be formed by resin molding. Thus, the recess 57 is formed easily. For example, in the case of a terminal to be bent at 90° behind the recess 57, the recess 57 is formed by cutting after bending. Thus, manufacturing is very difficult. In such a case, the above configuration preferably is adopted.

The terminal holding portion 74 may include the two holding projections 76 arranged to face each other while being spaced apart by a distance smaller than the outer diameter of the retainer mounting portion 55 and surround the retainer mounting portion 55 over at least half the circumference from one of the holding projections 76 to the other. Thus, the holding projections 76 hold the retainer mounting portion 55 so as not come out of the holding portion 74.

The terminal holding portion 74 may be formed to contact the front engaged portion 54, whereas the thick portion 78 projects back from the rear end part 77 of the terminal holding portion 74 and contacts the rear engaged portion 56. According to this configuration, the terminal holding portion 74 can suppress the inclination of the terminal 50 by contacting the rear engaged portion 56 while retaining the terminal 50 by contacting the front engaged portion 54.

The housing 30 in the connector 10 may include the outer housing 31 fixed to the body of the vehicle and the inner housing 32 to be fit into the outer housing 31 from the inner side of the vehicle. Additionally, the terminal-fitted retainer 20 may be assembled completely with the outer housing 31 by accommodating the terminals 50 into the terminal accommodating chambers 38 on the side of the outer housing 31 after the terminals 50 are assembled temporarily with the inner housing 32 by being accommodated into the terminal accommodating chambers 38 on the side of the inner housing 32. Thus, a temporary assembling operation is facilitated since the inclination of the terminals 50 can be suppressed when the terminal-fitted retainer 20 is assembled temporarily with the inner housing 32. Further, a complete assembling operation is also facilitated since the inclination of the terminals 50 can be suppressed also when the terminals 50 are assembled into the outer housing 31.

The technology disclosed in this specification is not limited to the above described embodiment. For example, the following various modes also are included.

The thick portion 78 is accommodated in the clearance between the terminal holding portion 74 and the rear surface of the recess 57 in the front-back direction in the above embodiment. However, it may be accommodated in a clearance between the terminal holding portion 74 and the front surface of the recess 57.

The recess 57 is formed by resin-molding the rear engaged portion 56 in the above embodiment. However, it may be formed by cutting, for example, in the case of a straight terminal not to be bent at 90°.

Female terminals may be used instead of the male terminal 50.

The terminal 50 is held by the holding projections 76 in the above embodiment. However, the terminal holding portion may be slightly smaller than the retainer mounting portion 55 and the terminal 50 may be held by press-fitting.

The thick portion 78 projects back from the rear end part 77 of the terminal holding portion 74 in the above embodiment, but it may project forward from a front end part of the terminal holding portion.

Although the housing 30 is formed by assembling the outer housing 31 and the inner housing 32 in the above embodiment, it may be a housing in which an outer housing and an inner housing are formed unitarily.

REFERENCE SIGNS

10 . . . connector
30 . . . housing
31 . . . outer housing
32 . . . inner housing
38 . . . terminal accommodating chamber
50 . . . terminal
51 . . . terminal connecting shaft portion
54 . . . front engaged portion 55 . . . retainer mounting portion
56 . . . rear engaged portion
57 . . . recess
58 . . . rear surface (of front engaged portion)
60 . . . front surface (of rear engaged portion)
70 . . . retainer
74 . . . terminal holding portion
76 . . . holding projection
77 . . . rear end part of (terminal holding portion)
78 . . . thickening portion

What is claimed is:

1. A terminal-fitted retainer, comprising:
at least one terminal including at least one recess provided on an outer peripheral surface and to be accommodated in at least one terminal accommodating chamber formed in a housing, the terminal including a front engaged portion having a rear surface, a rear engaged portion having a front surface opposed to and spaced rearward of the rear surface of the front engaged portion and a retainer mounting recess between the front surface of the rear engaged portion and the rear surface of the front engaged portion, the retainer mounting recess having a smaller diameter than the front engaged portion and the rear engaged portion; and
the retainer to be mounted into the housing while retaining the terminal, the retainer including at least one terminal holding portion for holding the terminal by being fit into the retainer mounting recess and at least one thick portion extending from the terminal holding portion and filling a clearance between the terminal holding portion and one of front and rear surfaces of the retainer mounting recess in a front-back direction.

2. The terminal-fitted retainer of claim 1, wherein the terminal includes a shaft, the front engaged portion being connected to the shaft and having a larger diameter than the shaft.

3. The terminal-fitted retainer of claim 1, wherein the terminal holding portion includes two holding projections arranged to substantially face each other while being spaced apart by a distance smaller than an outer diameter of the retainer mounting recess and at least partly surrounds the retainer mounting recess over at least half the circumference from one of the holding projections to the other holding projections.

4. The terminal-fitted retainer of claim 1, wherein the terminal holding portion contacts the front engaged portion and the thick portion projects back from a rear end part of the terminal holding portion and contacts the rear engaged portion.

5. A connector comprising:
an inner housing to be fit to an inner side of a vehicle;
a terminal-fitted retainer assembled with the inner housing to define a subassembly, the terminal-fitted retainer including:
at least one terminal including a shaft and a retainer mounting recess rearward of the shaft, the retainer mounting recess having opposed front and rear surfaces spaced apart along a front-rear direction; and
a retainer including a retainer main body with at least one terminal holding slot that opens out in a direction transverse to the front-back direction and that is engaged with the retainer mounting recesses of the terminal, at least one thick portion formed on the retainer main body adjacent the terminal holding slot and projecting in the front-rear direction sufficiently to fill a clearance between the retainer main body and at least one of the front and rear surfaces of the retainer mounting recess in the terminal; and
an outer housing fit to an outer side of the vehicle and having at least one terminal accommodating chamber extending in the front-back direction, the subassembly comprised of the inner housing and the terminal-fitted retainer being assembled to the outer housing by inserting the shaft of the terminal through the terminal accommodating chamber in the front-back direction.

6. The connector of claim 5, wherein the retainer main body includes two holding projections projecting into the terminal holding slot at positions facing each other while being spaced apart by a distance smaller than an outer diameter of the retainer mounting recess and at least partly surrounding the retainer mounting recess over at least half a circumference from one of the holding projections to the other holding projections.

7. A terminal-fitted retainer, comprising:
at least one terminal including a shaft and a retainer mounting recess rearward of the shaft, the retainer mounting recess having opposed front and rear surfaces spaced apart along a front-rear direction; and
a retainer including a main body with at least one terminal holding slot that opens out in a direction transverse to the front-back direction and that is engaged with the retainer mounting recesses of the terminal, two holding projections projecting into the terminal holding slot at positions facing each other while being spaced apart by a distance smaller than an outer diameter of the retainer mounting recess and at least partly surrounding the retainer mounting recess over at least half a circumference from one of the holding projections to the other holding projections, at least one thick portion formed on the retainer main body adjacent the terminal holding slot and projecting in the front-rear direction sufficiently to fill a clearance between the retainer main body and at least one of the front and rear surfaces of the retainer mounting recess in the terminal.

* * * * *